United States Patent
Barber et al.

(10) Patent No.: US 12,190,877 B1
(45) Date of Patent: Jan. 7, 2025

(54) DEVICE ARBITRATION FOR SPEECH PROCESSING

(71) Applicant: Amazon Technologies, Inc., Seattle, WA (US)

(72) Inventors: Jarred Barber, Cambridge, MA (US); Tao Zhang, Cambridge, MA (US); Yifeng Fan, Champaign, IL (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 400 days.

(21) Appl. No.: 17/685,232

(22) Filed: Mar. 2, 2022

Related U.S. Application Data

(60) Provisional application No. 63/287,687, filed on Dec. 9, 2021.

(51) Int. Cl.

| | |
|---|---|
| *G10L 15/22* | (2006.01) |
| *G10L 15/02* | (2006.01) |
| *G10L 15/08* | (2006.01) |
| *G10L 15/16* | (2006.01) |
| *G10L 15/28* | (2013.01) |
| *G10L 25/21* | (2013.01) |
| *G10L 25/84* | (2013.01) |
| *H04R 1/40* | (2006.01) |
| *H04R 3/00* | (2006.01) |

(52) U.S. Cl.
CPC .............. *G10L 15/22* (2013.01); *G10L 15/02* (2013.01); *G10L 15/16* (2013.01); *G10L 15/28* (2013.01); *G10L 25/21* (2013.01); *G10L 25/84* (2013.01); *H04R 1/406* (2013.01); *H04R 3/005* (2013.01); *G10L 2015/088* (2013.01)

(58) Field of Classification Search
CPC ......... G10L 15/22; G10L 15/02; G10L 15/16; G10L 15/28; G10L 25/21; G10L 25/84; G10L 2015/088; H04R 1/406; H04R 3/005

See application file for complete search history.

(56) References Cited

U.S. PATENT DOCUMENTS

| | | | |
|---|---|---|---|
| 9,875,081 B2 * | 1/2018 | Meyers ................... | G06F 3/167 |
| 10,425,780 B1 * | 9/2019 | Devaraj .................. | H04W 4/08 |
| 10,425,781 B1 * | 9/2019 | Devaraj ................. | H04W 8/186 |
| 10,536,287 B1 * | 1/2020 | Leblang ................. | G10L 15/22 |
| 10,546,583 B2 * | 1/2020 | White ..................... | G10L 15/28 |
| 10,685,652 B1 * | 6/2020 | Cherukuri .............. | G10L 25/51 |

(Continued)

FOREIGN PATENT DOCUMENTS

WO    WO-2017044629 A1 *    3/2017    ............. G06F 3/167

*Primary Examiner* — Mohammad K Islam
(74) *Attorney, Agent, or Firm* — K&L Gates LLP

(57) ABSTRACT

Devices and techniques are generally described for nearest device arbitration. In various examples, a first device may receive first audio data representing a wakeword spoken by a first speaker at a first time. In some examples, a second device may receive second audio data representing the wakeword spoken by the first speaker at the first time. In some cases, the first device may generate first feature data representing the first audio data and the second device may generate second feature data representing the second audio data. In various examples, a machine learning model may use the first feature data and the second feature data to generate first prediction data representing a prediction that the first device is closer to the first speaker than the second device.

20 Claims, 9 Drawing Sheets

(56) References Cited

U.S. PATENT DOCUMENTS

| | | | | |
|---|---|---|---|---|
| 10,701,067 B1 * | 6/2020 | Ziraknejad | | H04W 12/63 |
| 10,878,812 B1 * | 12/2020 | Helwani | | G10L 25/84 |
| 11,069,364 B1 * | 7/2021 | Souza | | H04R 5/04 |
| 11,302,329 B1 * | 4/2022 | Sun | | G10L 25/51 |
| 2015/0161995 A1 * | 6/2015 | Sainath | | G10L 15/063 |
| | | | | 704/232 |
| 2016/0099007 A1 * | 4/2016 | Alvarez | | G10L 21/034 |
| | | | | 704/225 |
| 2016/0358614 A1 * | 12/2016 | Phielipp | | G10L 19/018 |
| 2017/0025124 A1 * | 1/2017 | Mixter | | G10L 15/22 |
| 2017/0076720 A1 * | 3/2017 | Gopalan | | G10L 15/22 |
| 2019/0156819 A1 * | 5/2019 | Shafran | | G10L 15/02 |
| 2019/0362715 A1 * | 11/2019 | Aggarwal | | G06F 3/1423 |
| 2021/0026593 A1 * | 1/2021 | Wang | | G06F 3/167 |
| 2022/0279063 A1 * | 9/2022 | Coffman | | G06F 3/0482 |
| 2023/0096372 A1 * | 3/2023 | Wang | | H04W 12/63 |
| | | | | 726/26 |

* cited by examiner

| Parameter | Distribution |
| --- | --- |
| Room length/width (m) | Uniform(3.0, 10.0) |
| Room height (m) | Uniform(2.5, 6.0) |
| Reverberation time (s) | Beta(2.5, 1.8) |
| Number of devices | Categorical: $P(2,3,4,5)=0.7,0.3,0.03,0.02$ |
| Device location | Beta(0.2, 0.2) |
| Speaker location | Beta(0.2, 0.2) |
| Number of noise sources | Poisson(2) |
| Noise source location | Uniform(0, 1) |
| Noise level (dB SPL) | Uniform(25, 80) |
| Speech level (dB SPL) | Uniform(45, 70) |
| Device type | Uniform from $X$ device types |

FIG. 8

DEVICE ARBITRATION FOR SPEECH PROCESSING

CROSS-REFERENCE TO RELATED APPLICATIONS

This application claims the benefit of U.S. Provisional Patent Application No. 63/287,687, filed Dec. 9, 2021, the disclosure of which is incorporated herein by reference in its entirety.

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

BRIEF DESCRIPTION OF DRAWINGS

FIG. 8 is an example table illustrating distributions that may be used to sample arbitration scenario parameters, in accordance with various aspects of the present disclosure.

DETAILED DESCRIPTION

Figure 1:
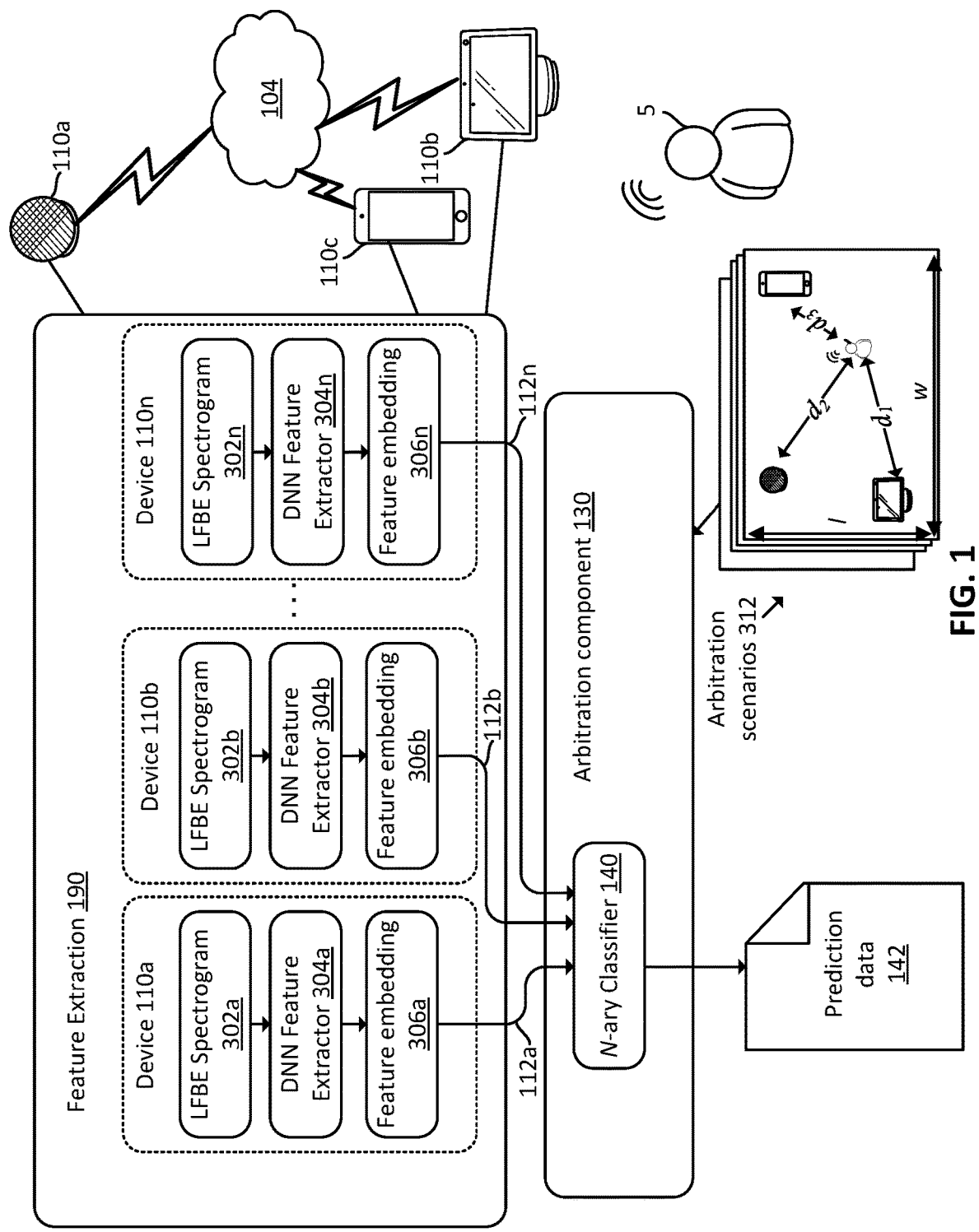
FIG. 1 illustrates a system configured to perform device arbitration for speech processing, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Electronic devices may be used to capture audio input and generate audio output or other types of output. For example, an electronic device may generate audio using loudspeakers and may capture audio input (such as spoken commands and/or questions) using one or more microphones. A user may have multiple electronic devices within his/her household, office, hotel room, vehicle, or other space. If such devices are located in acoustic proximity to each other (e.g., capable of capturing the same audio), a spoken wakeword—used to cause the devices to begin additional processing of and/or in response to the audio—may be detected by each of the electronic devices. Described herein are arbitration techniques that may be used to select a single device to capture and/or send subsequently captured audio (e.g., a spoken command and/or question following the wakeword or other triggering sound). The other (non-selected) electronic devices may be instructed to cease capturing and/or sending audio data (e.g, to a remote device) for the particular interaction and/or session. Additionally, the various techniques described herein may be used to detect range of different devices capturing wakewords or other audio. The range information (e.g., the range of the audio source with respect to different devices) may be used to transfer experiences between different devices based on the range. For example, if a user is initially participating in a voice over internet protocol (voice over IP) phone call with a first device and the user then walks into a different room, the phone call may be transferred to a different, closer device based on range information determined using the various techniques described herein. In another example, a user may be listening to music in a first room and may subsequently move to another room. The music may be transferred to the room in which the user is currently located based on range information associated with noises created by the user (e.g., the user talking and/or making noise in the room in which the user is currently located). In various examples, such uses may be enabled/disabled by the user in a companion application of the various devices such that the user is able to create an experience that is tailored to their preferences.

A growing number of households, offices, vehicles, and/or other locations have multiple natural language processing-enabled devices, such as speech processing-enabled devices, such as Amazon Alexa or Google Home. These devices typically operate by listening for a specific wakeword (such as "Alexa" or "Hey Google") and/or other triggering sound (e.g., glass breaking, door opening closing, baby crying, dog barking, foot steps in a home with a security system set to "Away mode," etc.) to trigger the processing of speech (or other actions such as security alerts) and the generation of responses and/or the performance of requested actions. When multiple speech processing devices are present, multiple devices may detect the same speech (e.g., a spoken wakeword), creating ambiguity as to which device is the correct one to service the spoken request. In various examples, systems and techniques are described herein that may be used to determine the device that is physically closest to the user for a given user utterance that includes the wakeword, and that device may be presumed to be the one to which the wakeword was directed. In some previous approaches, signal levels (e.g., signal-to-noise ratios) may be used to determine the closest device. However, since different types of devices may have different microphone arrays with different sensitivities, such approaches may not always select the device that is, in fact, closest to or otherwise best positioned to "hear" the speaker. Accordingly, given short segments of audio (e.g., containing the wakeword speech) recorded from a set of N heterogeneous devices (microphone arrays), a goal may be to determine which device is best positioned to the speaker (e.g., closest and/or receiving the clearest audio signal) who said the wakeword or other audio (e.g., speaking during an audio call with another person). Furthermore, a goal may be to make this determination without any a priori knowledge of the spatial relationships between the voice interface devices and/or the acoustic environment that such devices are located in. Additionally, as described herein, the system and techniques may be optimized to operate on resource-constrained devices with minimal latency.

When multiple microphones (and/or microphone arrays) are present (many smart speakers, phones, tablets, televisions, vehicles, and personal computers have multiple microphones), time difference of arrival (TDOA) algorithms can be used to estimate the range from the device to the speaker; however, these algorithms generally require physically large arrays to achieve high accuracy. Speech processing-enabled devices are often constrained in terms of memory size and/or computing resources and, even if not, benefit from using less memory and/or other resources for the voice user interface functionality. Additionally, the various techniques described herein are able to determine the best-positioned device to process audio without requiring the different candidate devices to be synchronized to some clock signal. Another class of signal processing methods are energy-based methods, which exploit the free-field relationship $E \propto 1 \, R^2$ between energy and range. When this relationship holds, the closest device receives the maximum energy from the audio source. However, in the home environment, these methods may sometimes face difficulties in reverberant rooms with high levels of noise and interference (such as televisions, air conditioners, dish washers, etc.).

Described herein are device arbitration systems and techniques that employ an end-to-end machine learning based approach to determine the physically closest device to the speaker, including techniques using input audio to do so. In various examples, a common feature extractor executes on each speech processing-enabled device. Accordingly, feature data representing characteristics of the audio detected by each device is generated separately in each device. Additionally, a classification network is described that ingests and combines the feature data from an arbitrary numbers of devices. The entire system is trained to predict the optimal arbitration decision (e.g., the speech processing-enabled device that is closest to the speaker).

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. In some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data (e.g., computer-executable instructions) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software and the Cortana system from Microsoft of Redmond, Washington, the Alexa system from Amazon.com, Inc. of Seattle, Washington, etc. Other examples of smart home devices and/or systems that may use the various device arbitration techniques described herein may include Google Nest Smarthome products from Google LLC, HomeKit devices from Apple Inc., etc. In addition, the various device arbitration techniques described herein may be implemented on a natural language processing enabled device and/or on another device that is communicating on a network with one or more other network-connected devices. For example, the various device arbitration techniques described herein may be executed on a smart home "hub" device configured to control various other network-connected devices on premises. In some other examples, the various device arbitration techniques described herein may be executed on a mobile device (e.g., on a user's phone, laptop, etc.), a smart speaker device, or a desktop device.

Natural language processing enabled devices may include one or more microphones (e.g., far-field microphone arrays)

used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword (e.g., a wakeword) or other triggering audio event is detected in the audio data. When a wakeword or other triggering audio event is detected, the speech processing enabled device may enter a "sending mode" in which audio detected by the microphones following the wakeword or other triggering audio event (e.g., data representing user request data spoken after the wakeword) may be sent to natural language processing computing component(s) (either locally or remotely) for further natural language processing (e.g., ASR, NLU, etc.). In various examples, the wakeword detection component may be used to distinguish between audio that is intended for the natural language processing system and audio that is not intended for the natural language processing system. As described herein, the device arbitration systems and techniques may be used to select a single device (with the goal being to determine the device that is closest device to the speaker) when multiple speech processing-enabled devices detect the wake word and/or other triggering audio event signals. Thereafter, a signal (e.g., command data comprising computer-executable instructions) may be sent to the other devices (e.g., the other devices detecting the wakeword or other triggering audio event apart from the single device determined by the device arbitration systems and/or techniques) and may be effective to cause the other devices to cease recording and/or sending of subsequent audio data. In some cases, this may lead to a privacy benefit as devices detecting the wakeword or other triggering audio event, as only the single device to which the user is speaking may continue to record, transmit, and/or process audio subsequent to the wakeword or other triggering audio event.

FIG. 1 illustrates a system configured to perform device arbitration for speech processing, in accordance with various aspects of the present disclosure. In various examples, multiple devices (e.g., devices 110a, 110b, ..., 110n, etc.) may be local to a user 5. The devices 110a, 110b, ..., 110n, may be configured in communication with one another over one or more networks 104. The network(s) 104 may be, for example, a wide area network (WAN), such as the Internet, a local area network (LAN), and/or some combination thereof. In addition, a natural language processing system 220 executed by one or more computing devices may be connected with the devices 110a, 110b, ..., 110n, across one or more networks 104.

Devices 110a, 110b, 110n, etc., may be examples of natural language processing-enabled devices that may have speech processing capability. In various examples, each of the devices 110a, 110b, ..., 110n (collectively "devices 110") may include one or more microphones and may be effective to detect wakewords spoken by a user (e.g., user 5) or other triggering audio events. In some examples, the devices 110 may perform one or more natural language processing techniques locally on each of the devices 110. In other examples, some natural language processing techniques may be performed locally on the devices 110, while other natural language processing techniques may be performed remotely (e.g., on natural language processing system 220 and/or other devices). In some examples, natural language processing may be performed in part by the devices 110 and in part by one or more other devices (e.g., natural language processing system 220).

A user 5 may have multiple devices 110 set up in his/her home or other locations. When the user 5 speaks, more than one of the devices 110 may receive the audio signal depending on the location of the devices and the location of the user. Various acoustic characteristics may influence the received audio signal energy at each device. In various examples, the feature extractor components executed by each of the devices 110a, 110b, ..., 110n may be a deep neural network (DNN) that may be trained in an end-to-end fashion with the N-ary classifier 140 of arbitration component 130 using arbitration scenarios 312 (representing sampled room parameters of simulated rooms including dimensions l×w). Arbitration scenarios 312 and training are described in further detail below. The respective feature extractor components may be encoders that may transform audio data received by the devices 110 (e.g., the audio signal representing the wakeword or other triggering audio event as detected by each device 110a, 110b, ..., 110n) into feature representation data representing the received audio during feature extraction 190. For example, user 5 may speak a wakeword and each device 110a, 110b ... 110n may detect the audio including the spoken wakeword. However, due to different placements of the devices 110a, 110b, ..., 110n in the physical space, due to different microphones and/or microphone arrays, due to different audio front end processing, etc., the characteristics of the audio signals received by the different devices 110a, 110b, . . . , 110n may differ with respect to one another. Accordingly, the feature data representing such detected audio data may also differ. In various examples and as described in further detail below, the feature data generated by the feature extractors may represent the energy of the received signals (e.g., log-filterbank energy (LFBE) feature data representing the received audio).

After training, each device of an arbitrary number of devices (e.g., devices 110a, 110b, . . . , 110n) that detect a spoken wakeword may generate an LFBE spectrogram 302 (e.g., LFBE spectrogram 302a, . . . , 302n) representing the energy of the audio that was received by the particular device. In image, audio, and/or other signal processing, a filter bank is an arrangement of filters (e.g., bandpass filters) that split the input signal into a set of analysis signals, each of the analysis signals carrying a single frequency sub-band of the original signal.

For example, given an input audio signal x(n), filter banks may separate this input audio signal into a set of analysis signals (e.g., $x_1(n)$, $x_2(n)$, $x_3(n)$, etc.), with each of these set of analysis signals corresponding to a different region in the spectrum of the input signal x(n). This set of analysis signals $x_1(n)$, $x_2(n)$, $x_3(n)$ . . . can be obtained by filter banks with bandwidths $BW_1$, $BW_2$, $BW_3$ . . . and center frequencies $f_{c1}$, $f_{c2}$, $f_{c3}$ . . . respectively.

Mel Filter Banks are a triangular filter bank that works similar to the way human ears perceive sound which is more discriminative at lower frequencies and less discriminative at higher frequencies. Mel Filter Banks are used to provide a better resolution at low frequencies and less resolution at high frequencies. It captures the energy at each frequency band and gives approximates the spectrum shape. Accordingly, the log-filterbank energy (LFBE) may represent the Mel filter bank energy at each frequency band as feature data. DNN feature extractors 304 (including DNN feature extractors 304a, . . . , 304n) executed on each device may be used to generate numerical feature data representing the LFBE data. Since the DNN feature extractors 304 are trained end-to-end with the N-ary classifier 140 the feature embeddings 306a, . . . , 306n representing the LFBE data may be useful for the prediction task of predicting the closest device (e.g., prediction data 142) to the source of the audio (e.g., the speaker of the wakeword). As described below, simulated data may be used to train the DNN feature extractors 304 and the N-ary classifier 140 in a supervised manner.

In various examples, upon receipt of a feature embedding 306, the arbitration component 130 may wait for a predefined time period to receive additional feature embeddings 306. This may allow the different feature embeddings 306a, . . . , 306n generated by the devices detecting the wakeword to be considered by the arbitration component 130. At the expiration of the time period, the arbitration component 130 may input the feature embeddings 306 received during the predefined time period into the N-ary classifier 140 to generate prediction data 142. Any feature embeddings 306 received after the expiration of the predefined time period may be discarded to mitigate latency concerns. In various examples, the feature embeddings 306a, . . . , 306n may be sent to arbitration component 130 using a secure and private functional layer for secure transmission. For example, a cryptographic layer such as secure multiparty computation (SMPC) may be used to ensure secure and private communication of the feature embeddings 306a, . . . , 306n.

Accordingly, when the user 5 speaks a wakeword that is detected by devices 110a, 110b, 110n, etc., the respective feature extractor (e.g., DNN feature extractors 304a . . . 304n) executing on each device 110a, 110b, . . . 110n may generate respective feature data 112a, 112b, 112n. For example, the feature extractor executing on device 110a may generate feature data 112a representing the characteristics of the audio (e.g., LFBE feature data) detected by device 110a, and so on. The feature data 112a, 112b, 112n, etc. may be sent to arbitration component 130. Although in FIG. 1, the arbitration component 130 is shown as executing on natural language processing system 220, in various other examples, the arbitration component 130 may be executed by one of the devices 110a, 110b, . . . , 110n, and/or by another device. The device executing the arbitration component 130 may be local to the devices 110a, 110b, 110n and/or may be located at a remote location and may be in communication with devices 110a, 110b, 110n over network(s) 104. Feature data 112a, 112b, . . . , 112n, etc., may be input into N-ary classifier 140 (described in further detail below). The N-ary classifier 140 may be a neural network classifier trained to generate prediction data 142. The prediction data 142 may represent a prediction of the device (among devices 110a, 110b, . . . , 110n, etc.) that is closest to user 5 when the user spoke the wakeword.

As described in further detail below, the feature extractors (for each of devices 110a, 110b, . . . , 110n, etc.) and the N-ary classifier 140 may be trained end-to-end using simulated room data and audio data for both wakeword speakers and noise sources. Training data generation and sampling techniques are described in further detail below in reference to FIG. 3.

Figure 2:
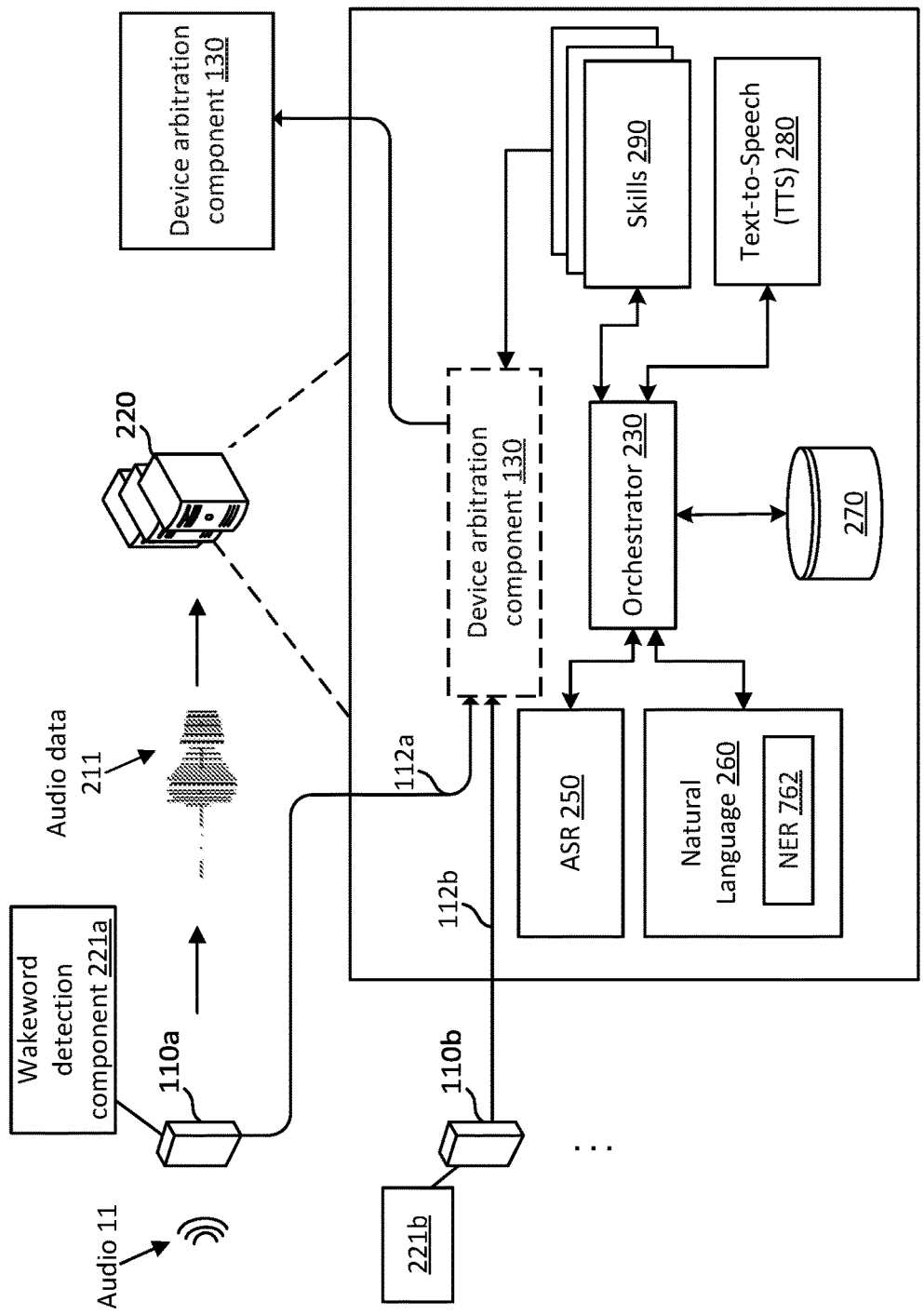
FIG. 2 is a block diagram of various components of a natural language processing system that may be used in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. For example, natural language processing system 220 may be executed wholly or in part by one or more of devices 110a, 110b, 110n, and/or one or more other computing devices. Communication between various components may occur directly or across a network(s). For example, ASR output data (e.g., text data representing a current utterance) output by ASR component 250 may be used to determine an intent of the utterance by natural language component 260. Thereafter, orchestrator component 230 may route the intent to one or more skill components 290 effective to process the intent (as well as slot data included in the utterance) to perform an action. In some cases, the action may include output of synthesized speech using the TTS component 280.

An audio capture component(s), such as a microphone or array of microphones of the devices 110a, 110b (e.g., a network-connected device that is enabled with natural language processing capability), captures audio 11. The devices 110a, 110b may each process the audio data, representing the audio 11, to determine whether speech is detected. The devices 110a, 110b may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the devices 110a, 110b may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the devices 110a, 110b may use respective wakeword detection components 221a, 221b to perform wakeword detection to determine when a user intends to speak an input to the devices 110a, 110b. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword.

The wakeword detection components 221a, 221b may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection components 221a, 221b may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may generate feature data 112a representing the audio that was received by the microphone(s) of device 110a. Similarly, the device 110b may generate feature data 112b representing the audio that was received by the microphone(s) of device 110b. The feature data 112a, 112b (as well as other feature data representing other devices detecting the wakeword) may be sent to device arbitration component 130. As shown, the device arbitration component 130 may be executed by the natural language processing system 220, while in other examples, the device arbitration component 130 may be a separate component. The device arbitration component 130 may generate prediction data indicating the device that is closest to the speaker that generated the audio 11. If the closest device is device 110a, the device arbitration component 130 may send a signal to the other devices (e.g., device 110b, etc.) instructing the device to cease capturing audio data and/or sending audio data to natural language processing system 220.

The device selected as the closest device to the speaker (e.g., device 110a) may begin sending audio data 211, representing the audio 11, to the natural language processing system 220. The audio data 211 may include data corresponding to the wakeword, or the portion of the audio data 211 corresponding to the wakeword may be removed by the device 110a prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110a, the natural language processing system 220, etc.) to execute the intent. For example, if the text data corresponds to "call John," the NLU component 260 may determine an intent that the system establish a two-way communication channel between the device 110a originating the call and a device of the recipient "John" (a named entity in the utterance). For further example, if the text data corresponds to "turn up volume on Artist X," the NLU component 260 may determine an intent that the system turn up the volume of playback. Named entity recognition 762 (NER component 762) may be used to determine the slot data "Artist X" in the example request.

The NLU component 260 outputs NLU results to the orchestrator component 230. The NLU results may include an NLU hypothesis, including a representation of an intent and corresponding slot data (e.g., "Artist X" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill 290. As described herein, in various examples, the skill component 290 may execute a capability runtime service (CRS) which may call a target determination component (not shown) for determining a device that may be targeted for the requested action/output. If the NLU results include multiple NLU hypotheses, the orchestrator component 230 may send a portion of the NLU results corresponding to the top scoring NLU hypothesis to a skill 290 associated with the top scoring NLU hypothesis.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 110a or a gateway system in order to complete certain functions. Inputs to a skill component 290 may come from various interactions and input sources. A skill component may include a communications skill component 290a which may correspond to a service for performing media processing that may be operated, for example, by a media processing unit (MPU) as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, as well as custom skills that are not associated with any preconfigured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 110a.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, settings, and the like. The system and techniques can be implemented on a geographic basis to ensure compliance with laws in various jurisdictions and objects in which the component(s) of the system(s) and/or user are located. Permissions may be obtained from a user associated with the device 110a, or other devices discussed herein.

Figure 3:
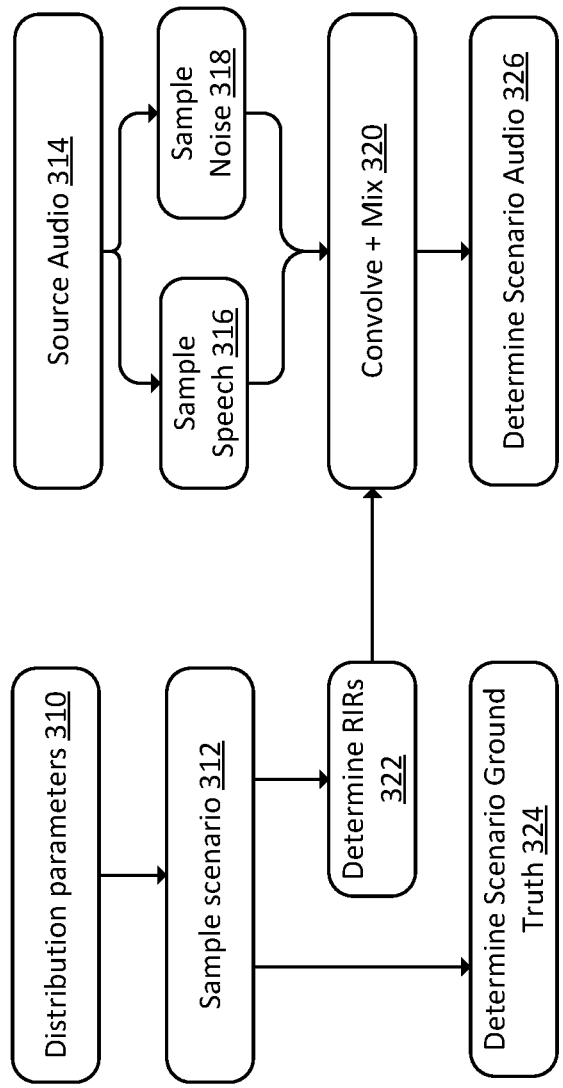
FIG. 3 depicts an example system for modeling device arbitration scenarios, in accordance with various aspects of the present disclosure.

FIG. 3 depicts an example system for modeling device arbitration scenarios, in accordance with various aspects of the present disclosure. A generative process is used to sample arbitration scenarios that may be used to train DNN feature extractors 304 and N-ary classifier 140 end-to-end. An arbitration scenario comprises a simulated room with its physical and acoustic properties, the spatial locations (e.g., two-dimensional location and/or three-dimensional location (depending on the implementation)) of a number of simulated devices placed in the room, and locations and dB sound pressure level (SPL) of a human speaker and/or noise sources. The sampled parameters of the simulated rooms are used to determine a set of room impulse responses (RIRs) for speech processing-enabled devices located in the simulated room. These RIRs are applied to a source audio dataset including both human speech audio samples (e.g., various audio segments of a human speaking the relevant wakeword) and noise samples (e.g., television noise, air conditioner noise, and/or any other type of background audio) and the resulting audio signals are mixed together for each device. This provides the appropriate microphone signals for each device, along with the information used to compute the device arbitration ground truth (e.g., a label representing the distance between the simulated speaker and each device in the simulated room).

Distribution parameters 310 include the various parameters of a simulated room. For a given simulated room, each parameter may be sampled from a respective distribution for that parameter. FIG. 8 depicts a table 800 including example parameters for a simulated room along with the distribution for each of the parameters that may be sampled from to generate an arbitration scenario 312. As shown in FIG. 8, the parameters may include dimensions of the room for a two-dimensional or three dimensional space (e.g., length, width, height, etc.), the number of different speech processing-enabled devices, the location of each of the devices (e.g., with respect to the room boundaries), a location of the speaker, a number of different noise sources in the simulated room, a noise level for each noise source, a speech level for the speaker, a device type (e.g., featuring different microphone arrays and/or audio front end, etc.), a reverberation time for sounds in the room, etc. An example depiction of sampled arbitration scenarios 312 is shown in FIG. 9.

Figure 9:
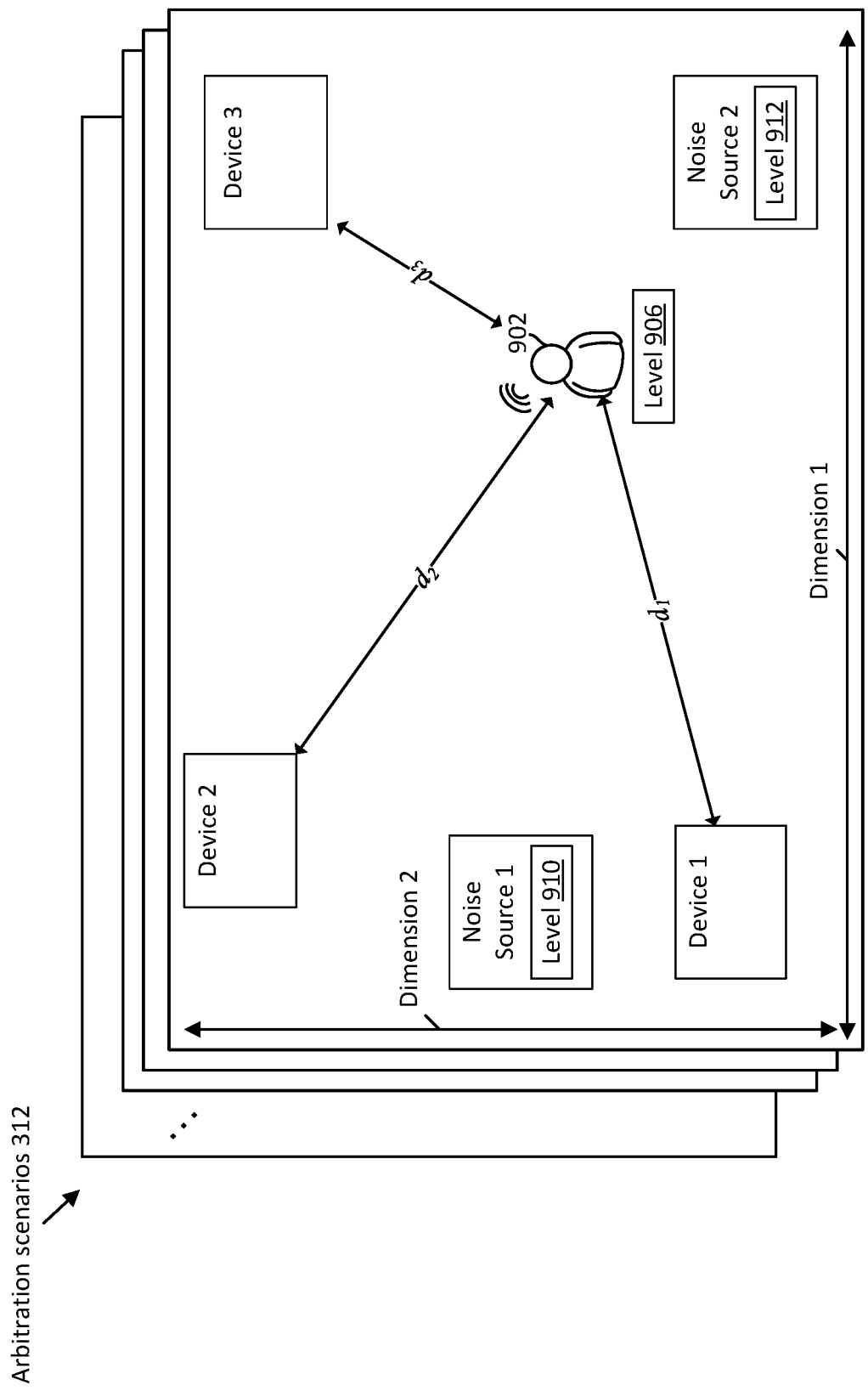
FIG. 9 illustrates example sampled arbitration scenarios that may be used in accordance with various aspects of the present disclosure.

In the example sampled arbitration scenario 312 of FIG. 9, there are three devices: Device 1, Device 2, and Device 3 each at a respective location in a two dimensional room having a width w sampled from the distribution for Dimension 1 and a length l (or height h) sampled from the distribution for Dimension 2. The location of each of Device 1, Device 2, and Device 3 may be sampled from the Device location parameter in FIG. 8. The Device 1, Device 2, and Device 3 may represent speech processing-enabled devices and may be of the same or different device types. As described previously, different device types may include different audio hardware (e.g., microphones and/or microphone arrays) and/or different audio processing software. Additionally, in the example arbitration scenario 312 of FIG. 9 there are two noise sources: Noise Source 1 and Noise Source 2 each at respective locations in the simulated room. Noise Source 1 may be associated with noise level 910 (sampled from a distribution for noise sources as shown in FIG. 8). Similarly, Noise Source 2 may be associated with noise level 912 (sampled from the distribution for noise sources, as shown in FIG. 8). Additionally, the speaker 902 may be associated with speech level 906 sampled from a distribution for speech levels (FIG. 8).

RIRs 322 may represent audio emitted by the various simulated speaker and/or noise sources in the simulated room. The RIRs 322 may be determined for each device in each sampled arbitration scenario 312. In the example sampled arbitration scenario 312 depicted in FIG. 9, a first RIR may be determined for Device 1 for the speech with speech level 906, a second RIR may be determined for Device 1 for Noise Source 1 having level 910, and a third RIR may be determined for Device 1 for Noise Source 2 having level 912. Similarly, RIRs may be determined for Device 2 and Device 3 for each audio source. The ground truth for each sample arbitration scenario 312 may include the distance between each device and the speaker. In the example of FIG. 9, the location of the speaker 902 in the simulated room is a distance $d_1$ from the location of Device 1, the location of the speaker 902 in the simulated room is a distance $d_2$ from the location of Device 2, and the location of the speaker 902 in the simulated room is a distance ds from the location of Device 3. In the example, device 3 may be the closest device to the speaker 902 (e.g., ds may be less than $d_2$ and $d_1$). Accordingly, the feature extractors and N-ary classifier 140 may be trained to minimize the error between the N-ary classifier 140's prediction and the ground truth closest device to the speaker.

Other parameters for arbitration scenarios 312 may be used apart from those specifically shown in FIG. 8 and/or described herein depending on the desired implementation. Upon determining the RIRs 322 between each sound source (speech/noise) and each device microphone, the RIRs may be applied to a source audio dataset and the noise and speech samples may be mixed for each device. This gives the microphone signals for each device, along with the data used to compute arbitration ground truth 324.

As previously described, arbitration scenarios 312 may be generated by sampling the scenario parameters from the distributions listed in the table 800 of FIG. 8 (or a similar table). First, the room properties may be sampled (e.g., room size data and reverberation time). Next, the simulated room may be populated with devices, speakers, and noise sources (as shown in FIG. 9). In some examples, rejection sampling may be applied to enforce a constraint that the minimum distance between the speaker and a device is at least 1 meter.

The room acoustics model may use an image source method augmented with high-fidelity physics modeling software (e.g., COMSOL) to generate models of the farfield responses for a number of different speech processing-enabled devices (e.g., specific devices for which the testing is to be performed). Specifically, for each device type (e.g., a 4th-generation Echo Dot from Amazon), the COMSOL models allow a function $\phi_m(\hat{r}, t)$ to be defined which gives the response of microphone m to an impulse from farfield direction $\hat{r}$ (as determined based on the location of the source audio and the receiving device). The resulting RIR is given by a sum over image sources as:

$$h_m(t) \propto \sum_{k=0}^{\infty} \frac{\beta^{n_k}}{t_k^m} \phi_m(\hat{r}_k^m, t - t_k^m) \qquad (1)$$

where $\beta$ is the room absorption coefficient (estimated from the desired reverberation time); $n_k$ is the order (number of reflections) of the kth image source; $t_k^m$ and $\hat{r}_k^m$ are the time delay and DOA vector from microphone m on the device to the image source. Using the per-microphone time delay may be important for correctly capturing the wavefront curvature across the device.

Source audio 314 may comprise any desired audio datasets which include audio samples of different humans (e.g., different ages, sexes, accents, languages, etc.) saying the relevant wakeword. For the noise source audio (e.g., background audio), recordings of ambient background noise (air conditioners, running water, televisions, etc.) may be used. The particular datasets may vary according to the desired implementation. For both source audio datasets (speech and noise), the speech segments may be partitioned into training/validation/test splits (e.g., using cross validation techniques), and the background audio segments may divided into non-overlapping subsegments before being assigned to training/validation/test splits. In various examples, audio may sampled at 16 kHz (or some other desired frequency).

In order to generate the audio data for each device in the sample arbitration scenario 312, speech (block 316) and noise (block 318) segments may be sampled from the appropriate source audio dataset. These audio samples may then be convolved (e.g., using a one dimensional convolution) with the speech and background RIRs computed by the room simulator (block 320). After convolution, the various output audio for speech and one or more noise sources may be mixed (e.g., added together component-wise at each time stamp) to generate an output audio sample. Lastly, the mixed audio for each device may have an independent timing jitter applied (Gaussian with σ=0.1 s) before being trimmed to a fixed length to determine the scenario audio (block 326). The timing jitter mimics the lack of synchronization between devices.

The machine learning architecture comprises the DNN feature extractors 304 and the N-ary classifier 140. The DNN feature extractors execute on each device, and generate respective feature embeddings 306. The N-ary classifier 140 may execute locally with respect to the devices or remotely (e.g., on a central hub device) to compute the final prediction data 142 and make the arbitration decision.

In some examples, a 2 second window of single-microphone audio may be used as input data. The audio may comprise the wakeword speech within the 2 second window. The audio may be converted to log-filterbank energy (LFBE) features. For example, a spectrogram with a 25 ms frame size and a 10 ms frame skip may be computed, followed by mapping the spectrogram to 64 mel-frequency band energies in the logarithmic domain. This results in a 201×64 LFBE image that may be fed into the N-ary classifier 140.

In one example, the DNN feature extractors 304 may comprise a network having 5 convolution layers (e.g., convolutional neural network layers), followed by a single fully-connected layer, with a total of 132 k parameters. However, the feature extractors 304 may be implemented in a variety of ways depending on the desired implementation. In the example, a 128 dimensional embedding is generated, which is passed to the N-ary classifier 140. The N-ary classifier 140 may be trained to map N 128-dimensional embeddings to N output probabilities. Accordingly, the N-ary classifier 140 is generalized to an arbitrary number N of devices. If the feature embedding 306a from device j is denoted as $z_j$, the network calculates the corresponding logit $l_j$ by:

$$\ell_j = g\left(z_j, \sum_i z_i\right) \qquad (2)$$

where g is a two-layer fully connected neural network. The network output of N-ary classifier 140 is given by applying a softmax function to the vector of logits. This approach to fusing the embeddings of the other devices to make a permutation-equivariant scoring function is maximally generic. The feature extractors 304 and N-ary classifier 140 networks may be simultaneously trained end-to-end (e.g., using Adam and standard cross-entropy loss), where ground truth is extracted from the simulated room scenarios, as described above.

Figure 4:
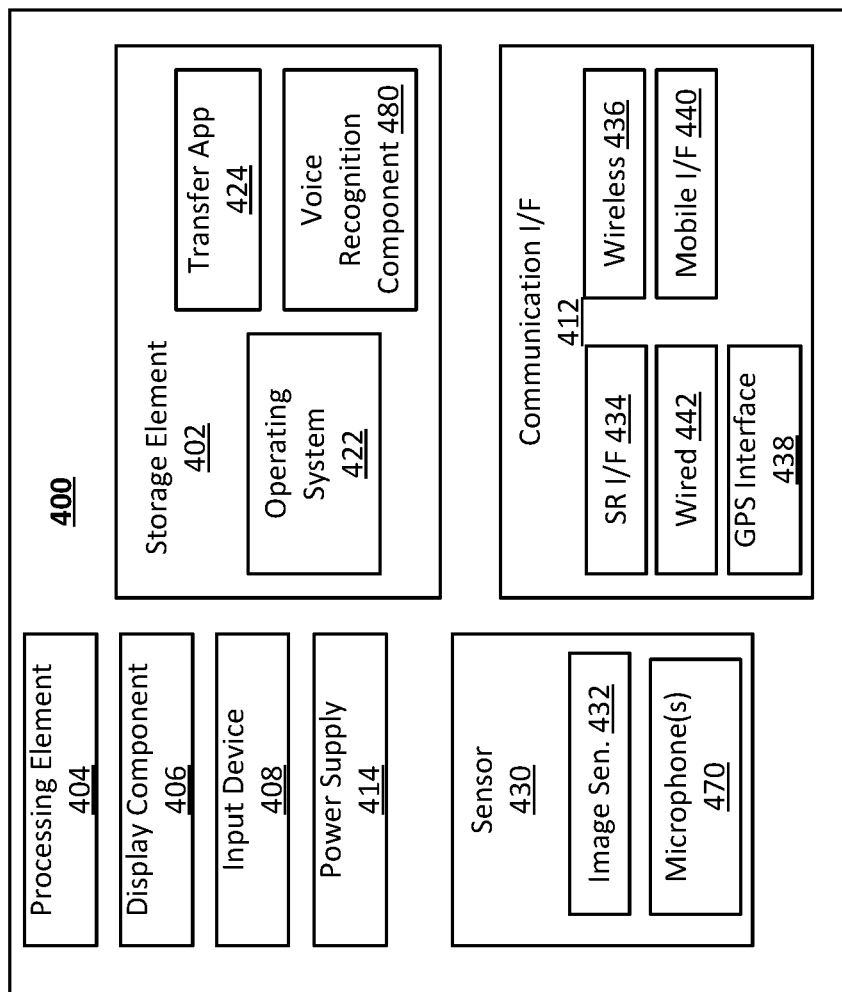
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise arbitration component 130 and/or a DNN feature extractor 304.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412. As described herein, if the device including architecture 400 is determined by arbitration component 130 to not be the closest device to the speaker speaking the wakeword, a signal may be sent to voice recognition component 480. The signal may comprise command data effective to cause voice recognition component 480 to cease capturing (e.g., recording) and/or sending audio data.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
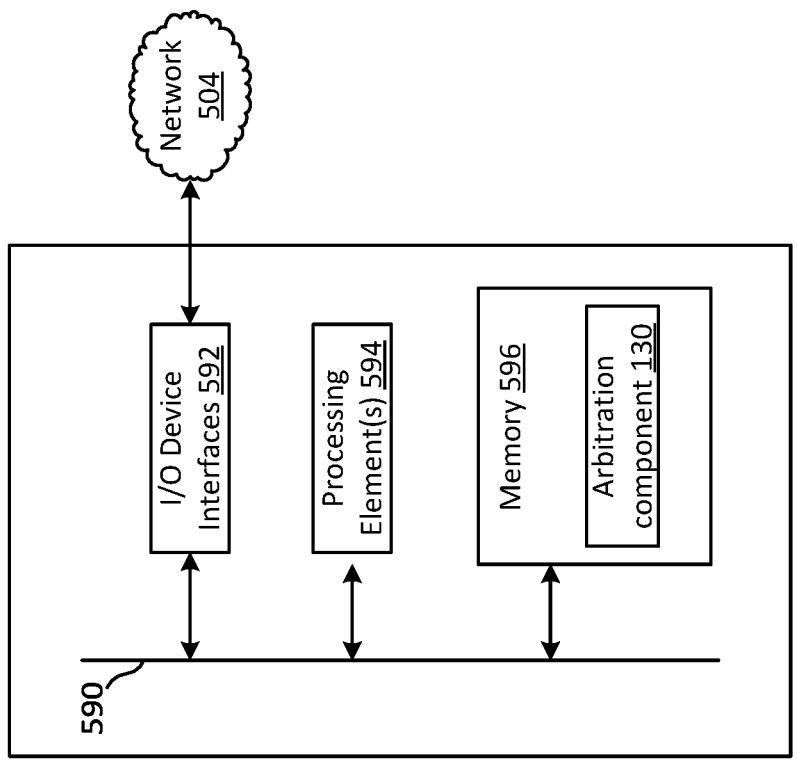
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows, when loaded from memory 596. In various further examples, memory 596 may be effective to store instructions effective to program controllers/processors 594 to perform the various techniques described above in reference to FIGS. 1-3B. Accordingly, in FIG. 5, arbitration component 130 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of a speech processing system may include input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
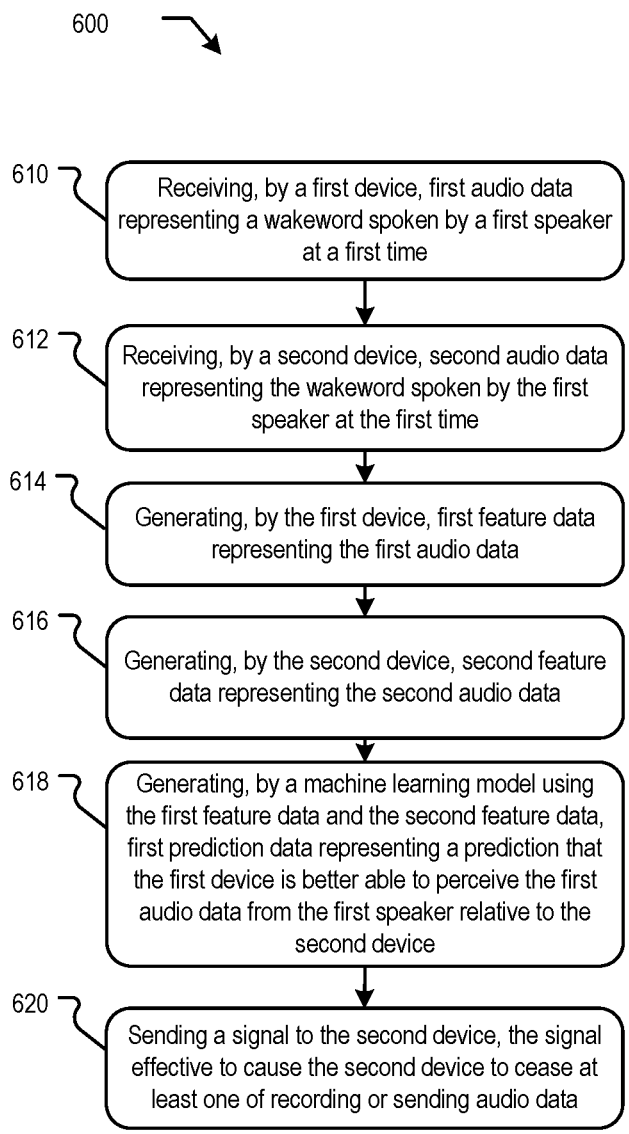
FIG. 6 depicts a flow chart showing an example process for device arbitration for speech processing, in accordance with various aspects of the present disclosure.

FIG. 6 depicts a flow chart showing an example process 600 for device arbitration for speech processing, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which a first audio data may be received by a first device. The first audio data may represent a wakeword spoken by a first speaker at a first time. Processing may continue at action 612, at which a second device, different from the first device, may receive second audio data. The second audio data may represent the wakeword that was spoken by the first speaker at the first time, as captured by one or more microphones of the second device. Accordingly, the first audio data and the second audio data may both represent the same spoken wakeword, as perceived separately by each of the first and second device. In various examples, the first device and second device may be different types of speech processing-enabled devices including different hardware and/or software. However, in some other examples, the devices may be of the same type.

Processing may continue at action 614, at which the first device may generate first feature data representing the first audio data. For example, the first audio data may be transformed into an LFBE spectrogram or other data representation of the first audio data. The LFBE spectrogram or other data representation may be input into a DNN feature extractor 304*a* (or another feature extractor) which may generate the first feature data (e.g., feature embedding 306*a*).

Processing may continue at action 616, at which the second device may generate second feature data representing the second audio data. For example, the second audio data may be transformed into an LFBE spectrogram or other data representation of the second audio data. The LFBE spectrogram or other data representation may be input into a DNN feature extractor 304*b* (not specifically shown) which may generate the second feature data (e.g., feature embedding 306*b* (not specifically shown)).

Processing may continue at action 618, at which the first feature data and the second feature data may be input into a machine learning model (e.g., N-ary classifier 140). The machine learning model may generate first prediction data (e.g., prediction data 142). The first prediction data may represent a prediction of that the first device is better able to perceive the first audio data from the first speaker relative to the second device. For example, the first device may be the closest device to the wakeword spoken by the first speaker at the first time. In other examples, while the second device may be closer to the audio source, the first device may receive a clearer signal than the second device (e.g., due to interference, due to the microphone of the second device being defective, etc.). For example, the first prediction data may be a prediction that the first device is closer to the first speaker than the second device. In various examples, the machine learning model may include a softmax layer that may generate, at each node of the layer, respective scores. Each node may correspond to a particular device (including the first device and the second device) in the physical space. The node with the highest score for a given set of inputs may be selected and the device corresponding to that node may be determined to be the closest device to the first speaker when the first speaker spoke the wakeword.

Processing may continue at action 620, at which a signal may be sent to the second device. The signal may be effective to cause the second device to cease at least one of recording or sending audio data. In various examples, the signal may be sent to each device apart from the device predicted to be closest to the first speaker so that audio is no longer captured and/or transmitted by devices other than the predicted closest device.

Figure 7:
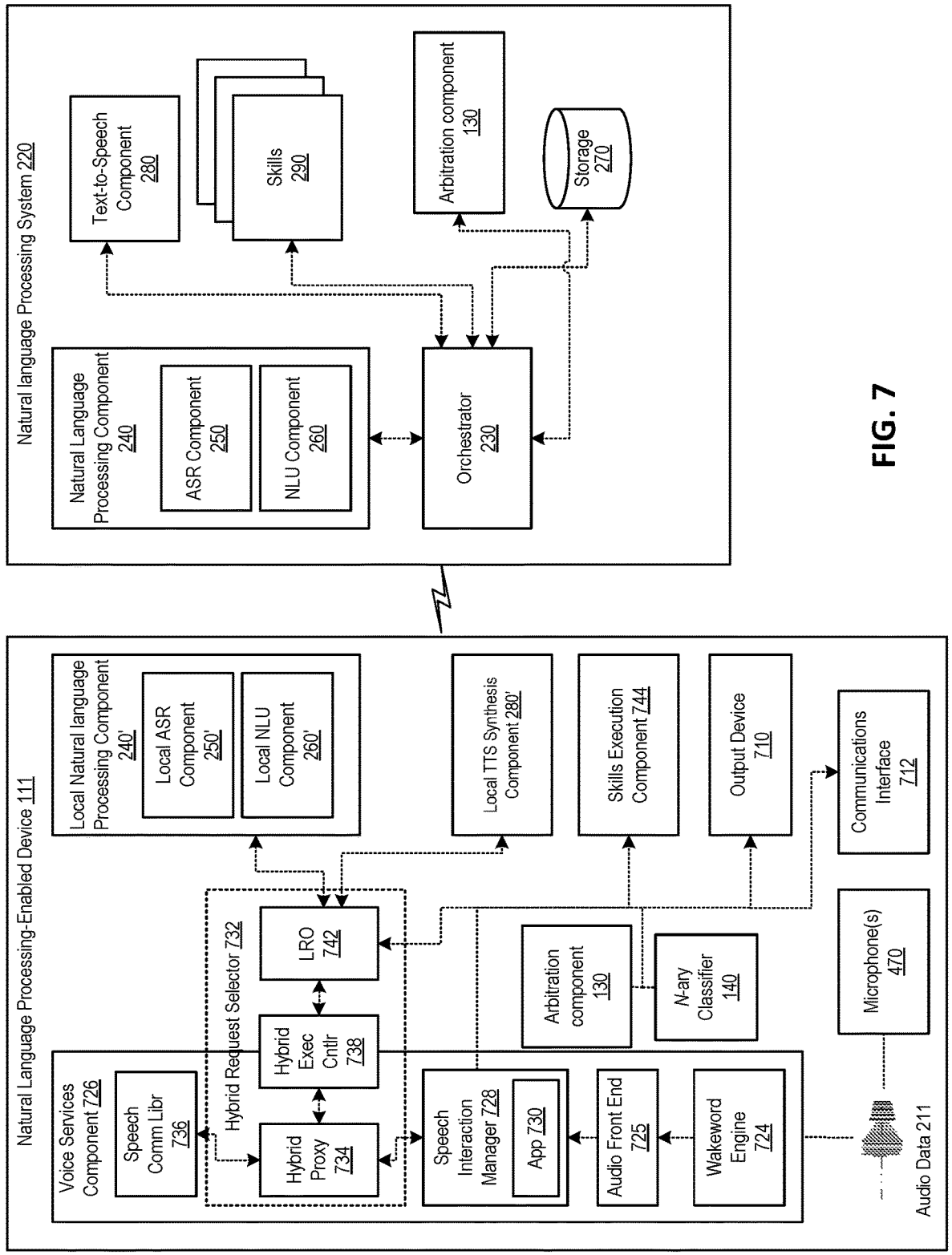
FIG. 7 is a block diagram illustrating a natural language processing-enabled device and a natural language processing management system, in accordance with embodiments of the present disclosure.

FIG. 7 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) the network-connected devices. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s)

710 (e.g., speakers, displays, and/or other network connected devices among network-connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with arbitration component 130 and N-ary classifier 140. Accordingly, the device 111 may be used to determine the device that is physically closest to a speaker speaking a wakeword among the devices detecting the wakeword. In various examples, the N-ary classifier 140 may be executed on each of one or more devices (e.g., among devices 110a, 110b, . . . , 110n) and a consensus prediction may be determined among multiple devices executing the N-ary classifier 140 (e.g., based on confidence scores generated by the various N-ary classifiers 140).

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 712) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 710 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 710 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 726. When a user utterance including the wakeword is captured by the microphone 470 of the device 111, the audio data 211 representing the utterance is received by a wakeword engine 724 of the voice services component 726. The wakeword engine 724 may be configured to compare the audio data 211 to stored models used to detect a wakeword (e.g., "Computer") that indicates to the device 111 that the audio data 211 is to be processed for determining an intent. Thus, the wakeword engine 724 is configured to determine whether a wakeword is detected in the audio data 211, and, if a wakeword is detected, the wakeword engine 724 can proceed with routing the audio data 211 to an audio front end (AFE) 725 (sometimes referred to as an acoustic front end (AFE)) of the voice services component 726. If a wakeword is not detected in the audio data 211, the wakeword engine 724 can refrain from sending the audio data 211 to the AFE 725, thereby preventing the audio data 211 from being further processed. The audio data 211 can be discarded.

The AFE 725 is configured to transform the audio data 211 received from the wakeword engine 724 into data for processing by a suitable ASR component and/or NLU component. The AFE 725 may reduce noise in the audio data 211 and divide the digitized audio data 211 into frames representing a time intervals for which the AFE 725 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 725 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 725 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 725 in beamforming, may be determined based on results of the wakeword engine 724's processing of the audio data 211. For example, the wakeword engine 724 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 728 of the voice services component 726 may receive the audio data 211 that has been processed by the AFE 725. The SIM 728 may manage received audio data 211 by processing request data and non-speech noise or sounds as events, and the SIM 728 may also manage the processing of commands that are used to respond to the user speech or non-speech noise or sounds (e.g., by controlling the action(s) of natural language processing components of device 111). The SIM 728 may include one or more client applications 730 for performing various functions at the device 111.

A hybrid request selector component 732 of the device 111 is shown as including a hybrid proxy component (HP) 734, among other components. The HP 734 can be implemented as a layer within the voice services component 726 that is located between the SIM 728 and a speech communication library (SCL) 736, and may be configured to proxy traffic to/from the natural language processing system 220. For example, the HP 734 may be configured to pass messages between the SIM 728 and the SCL 736 (such as by passing events and instructions there between), and to send messages to/from a hybrid execution controller component (HEC) 738 of the hybrid request selector component 732. For instance, command data received from the natural language processing system 220 can be sent to the HEC 738 using the HP 734, which sits in the path between the SCL 736 and the SIM 728. The HP 734 may also be configured to allow audio data 211 received from the SIM 728 to pass through to the natural language processing system 220 (via the SCL 736) while also receiving (e.g., intercepting) this audio data 211 and sending the received audio data 211 to the HEC 738 (sometimes via an additional SCL).

As will be described in more detail below, the HP 734 and the HEC 738 are configured to perform a handshake procedure to connect to each other. As part of this handshake procedure, the HP 734 and the HEC 738 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 738 determines whether to accept or reject the connection request from the HP 734. If the HEC 738 rejects the HP's 734 connection request, the HEC 738 can provide metadata to the HP 734 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 732 may further include a local request orchestrator component (LRO) 742. The LRO 742 is configured to notify the local natural language processing component 240' about the availability of new audio data 211 that represents user speech, and to otherwise initiate the operations of the local natural language processing component 240' when new audio data 211 becomes available. In general, the hybrid request selector component 732 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 742 may interact with a skills execution component 744 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 724, which detects the wakeword "Computer," and forwards the audio data 211 to the SIM 728 via the AFE 725 as a result of detecting the wakeword. The SIM 728 may send the audio data 211 to the HP 734, and the HP 734 may allow the audio data 211 to pass through to the natural language processing system 220 (e.g., via the SCL 736), and the HP 734 may also input the audio data 211 to the local natural language processing component 240' by routing the audio data 211 through the HEC 738 of the hybrid request selector 732, whereby the LRO 742 notifies the local natural language processing component 240' of the incoming audio data 211. At this point, the hybrid request selector 732 may wait for response data from the natural language processing system 220 and/or the local natural language processing component 240'.

The local natural language processing component 240' is configured to receive the audio data 211 from the hybrid request selector 732 as input, to recognize speech (and/or non-speech audio events) in the audio data 211, to determine an intent (e.g., user intent) from the recognized speech (or non-speech audio event). This intent can be provided to the skills execution component 744 via the LRO 742, and the skills execution component 744 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 744 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 744) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220. In various examples, the natural language processing system may be effective to detect other triggering audio events besides a wakeword. For example, a natural language processing system may be used in association with a security system. When the security system is armed the natural language processing system may listen for glass breaking noises, footsteps, talking, etc., in order to generate an alert and/or to trigger one or more other actions. In some other examples, functionality one or more devices may be controlled based on audio detected by one or more devices. For example, audio may be used to determine user presence which may affect device controls (e.g., allowing music playback to transition between different devices based on user presence). In general, the various techniques described herein may be used to determine a device that most clearly detects audio (e.g., the closest device to an audio source). However, in some cases, the closest device may not be selected by the techniques described herein (e.g., where a microphone of the closest device is covered (e.g., a towel laid on top of a device may muffle the input signal detected by the device's microphone) and does not receive a clear input audio signal).

Upon receipt by the natural language processing system 220, the audio data 211 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical_Artist]", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, the arbitration component 130 and/or the N-ary classifier 140 may be instantiated as a part of the natural language processing system 220 and/or as a separate component configured in communication with the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
   determining room size data by sampling a length l from a first distribution and a width w from a second distribution, wherein the room size data represents a room having dimensions including l×w;
   determining a first location of a speaker in the room, the first location defined by a first two-dimensional coordinate, wherein the first location is sampled from a third distribution;
   determining a second location of a noise source in the room, the second location defined by a second two-dimensional coordinate, wherein the second location is sampled from a fourth distribution;
   determining a third location of a first speech processing-enabled device in the room, the third location defined by a third two-dimensional coordinate, wherein the third location is sampled from a fifth distribution;
   determining a first audio sample representing a spoken wake word for the first speech processing-enabled device, wherein the first audio sample is sampled from a dataset of audio samples;
   determining a second audio sample representing background noise for the noise source, wherein the second audio sample is sampled from a dataset of noise samples;
   generating first audio data by convolving the first audio sample with a first impulse response associated with the first speech processing-enabled device, the first impulse response being associated with audio received at the third location from the first location;
   generating second audio data by convolving the second audio sample with a second impulse response associated with the first speech processing-enabled device, the second impulse response being associated with audio received at the third location from the second location;
   generating third audio data by adding the first audio data and the second audio data;
   generating, by a deep learning model, first feature representation data representing the third audio data; and
   generating, by a classifier of the deep learning model using the first feature representation data, first prediction data indicating that the first speech processing-enabled device is closest to the first location among other speech processing-enabled devices.

2. The method of claim 1, further comprising sending, to a second speech processing-enabled device of the other speech processing-enabled devices a first signal, the first signal effective to cause the second speech processing-enabled device to cease recording of audio data.

3. The method of claim 1, further comprising:
   determining a first distance between the first location and the third location;
   determining a second distance between the first location and a fourth location, wherein the fourth location is associated with a second speech processing-enabled device of the other speech processing-enabled devices; and
   determining that the first distance is less than the second distance, wherein the first prediction data is generated based on the first distance being less than the second distance.

4. A method comprising:
   receiving, by a first device, first audio data representing sound at a first time, the first audio data being detected by one or more microphones of the first device;
   receiving, by a second device, second audio data representing the sound at the first time, the second audio data being detected by one or more microphones of the second device;
   generating, by a first encoder associated with the first device, first feature data representing the first audio data based at least in part on a first impulse response associated with the first device;
   generating, by a second encoder associated with the second device, second feature data representing the second audio data based at least in part on a second impulse response associated with the second device; and
   generating, by a machine learning model using the first feature data and the second feature data, first prediction data representing a prediction that the first device is closer to a source of the sound than the second device.

5. The method of claim 4, further comprising sending first data to the second device, the first data effective to cause the second device to cease at least one of additional processing or sending audio data.

6. The method of claim 4, further comprising:
   determining a first simulated room having a first dimension sampled from a first distribution and a second dimension sampled from a second distribution;
   determining a first location of a third device in the first simulated room by sampling a first two-dimensional location from a third distribution;
   determining a second location of a simulated speaker by sampling a second two-dimensional location from a fourth distribution; and
   determining a third location of a first noise source by sampling a third two-dimensional location from a fifth distribution.

7. The method of claim 6, further comprising:
   determining a third impulse response for the third device for audio emitted by the simulated speaker at the second location; and
   determining a fourth impulse response for the third device for audio emitted by the first noise source at the third location.

8. The method of claim 7, further comprising:
   determining third audio data by convolving a first audio sample of speech with the third impulse response; and
   determining fourth audio data by convolving a second audio sample with the fourth impulse response.

9. The method of claim 8, further comprising:
determining fifth audio data for the third device by mixing the first audio data and the second audio data; and
generating a label for the fifth audio data indicating a distance between the first location and the second location.

10. The method of claim 9, further comprising:
inputting the fifth audio data into the machine learning model, wherein the machine learning model is effective to generate third feature data representing the fifth audio data; and
generating, by a classifier of the machine learning model using the third feature data, first data representing a prediction of the third device being a closest device to a first speaker.

11. The method of claim 4, further comprising:
executing the machine learning model by the first device, the second device, or a third device, wherein the first device, the second device, and the third device are configured in communication on a local area network.

12. The method of claim 4, further comprising:
generating two-dimensional log-filterbank energy (LFBE) data from the first audio data, wherein the first feature data comprises the two-dimensional LFBE data and the machine learning model comprises a convolutional neural network and a classifier.

13. A system comprising:
a first device;
a second device;
at least one processor; and
non-transitory computer-readable memory storing instructions that, when executed by the at least one processor, are effective to:
receive, by the first device, first audio data representing sound generated at a first time, the first audio data being detected by one or more microphones of the first device;
receive, by the second device, second audio data representing the sound generated at the first time, the second audio data being detected by one or more microphones of the second device;
generate, by a first encoder associated with the first device, first feature data representing the first audio data based at least in part on a first impulse response associated with the first device;
generate, by a second encoder associated with the second device, second feature data representing the second audio data based at least in part on a second impulse response associated with the second device; and
generate, by a machine learning model using the first feature data and the second feature data, first prediction data representing a prediction that the first device is closer to a source of the sound than the second device.

14. The system of claim 13, the non-transitory computer-readable memory storing further instructions that, when executed by the at least one processor, are further effective to:
send a signal to the second device, the signal effective to cause the second device to cease at least one of additional processing or sending audio data.

15. The system of claim 13, the non-transitory computer-readable memory storing further instructions that, when executed by the at least one processor, are further effective to:
determine a first simulated room having a first dimension sampled from a first distribution and a second dimension sampled from a second distribution;
determine a first location of a third device in the first simulated room by sampling a first two-dimensional location from a third distribution;
determine a second location of a simulated speaker by sampling a second two-dimensional location from a fourth distribution; and
determine a third location of a first noise source by sampling a third two-dimensional location from a fifth distribution.

16. The system of claim 15, the non-transitory computer-readable memory storing further instructions that, when executed by the at least one processor, are further effective to:
determine a third impulse response for the third device for audio emitted by the simulated speaker at the second location; and
determine a fourth impulse response for the third device for audio emitted by the first noise source at the third location.

17. The system of claim 16, the non-transitory computer-readable memory storing further instructions that, when executed by the at least one processor, are further effective to:
determine third audio data by convolving a first audio sample of speech with the third impulse response; and
determine fourth audio data by convolving a second audio sample with the fourth impulse response.

18. The system of claim 17, the non-transitory computer-readable memory storing further instructions that, when executed by the at least one processor, are further effective to:
determine fifth audio data for the third device by mixing the first audio data and the second audio data; and
generate a label for the fifth audio data indicating a distance between the first location and the second location.

19. The system of claim 18, the non-transitory computer-readable memory storing further instructions that, when executed by the at least one processor, are further effective to:
input the fifth audio data into the machine learning model, wherein the machine learning model is effective to generate third feature data representing the fifth audio data; and
generate, by a classifier of the machine learning model using the third feature data, first data representing a prediction of the third device being a closest device to a first speaker.

20. The system of claim 13, the non-transitory computer-readable memory storing further instructions that, when executed by the at least one processor, are further effective to:
executing the machine learning model by the first device, the second device, or a third device, wherein the first device, the second device, and the third device are configured in communication on a local area network.

* * * * *